L. B. DOMAN.
MOTOR MOUNTING FOR BELLOWS PUMPS.
APPLICATION FILED AUG. 2, 1918.
1,337,645.                                  Patented Apr. 20, 1920.
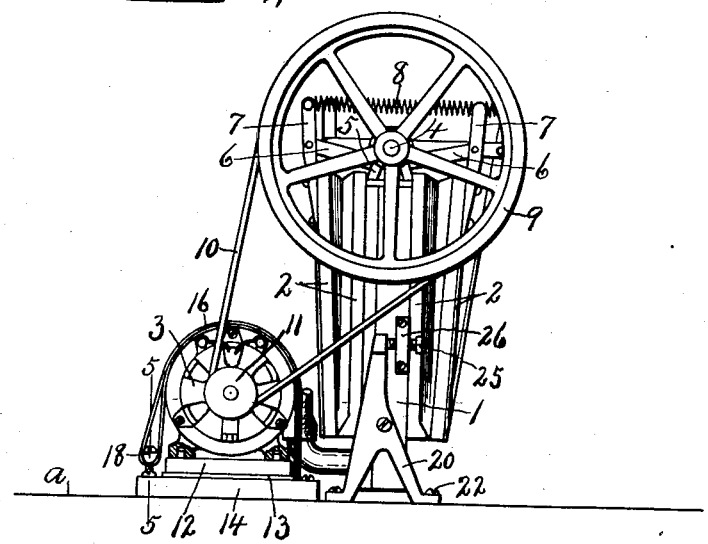
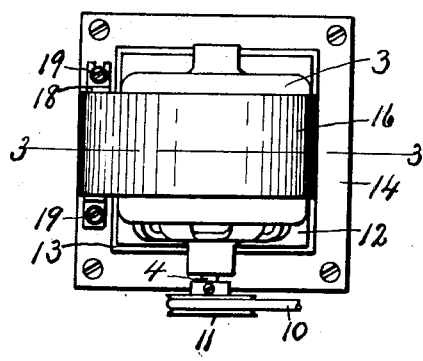
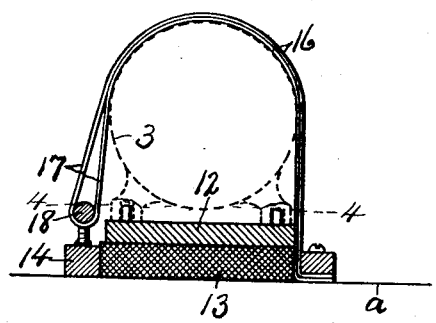
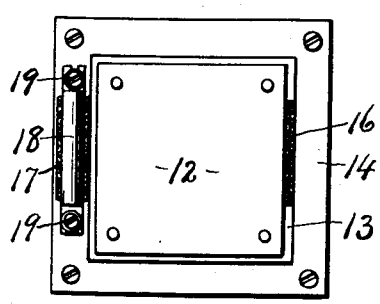
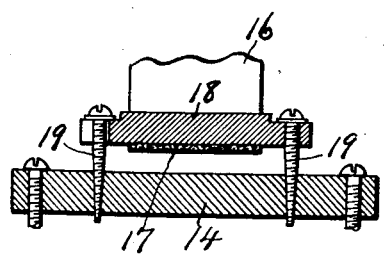
L. B. Doman INVENTOR
BY Howard P. Denison
ATTORNEY

UNITED STATES PATENT OFFICE.

LEWIS B. DOMAN, OF DE WITT, NEW YORK, ASSIGNOR TO THE AMPHION PIANO PLAYER COMPANY, OF SYRACUSE, NEW YORK, A CORPORATION OF NEW YORK.

MOTOR-MOUNTING FOR BELLOWS-PUMPS.

1,337,645.   Specification of Letters Patent.   Patented Apr. 20, 1920.

Original application filed February 14, 1916, Serial No. 78,175. Divided and this application filed August 2, 1918. Serial No. 247,919.

*To all whom it may concern:*

Be it known that I, LEWIS B. DOMAN, a citizen of the United States of America, and resident of De Witt, in the county of Onondaga, in the State of New York, have invented new and useful Improvements in Motor-Mountings for Bellows-Pumps, of which the following, taken in connection with the accompanying drawings, is a full, clear, and exact description.

This invention relates to certain improvements in supports for electric motors as used more particularly in self playing musical instruments, the main object being to reduce to a minimum the noise incidental to the operation of motors of this type so as not to interfere with the lowest musical tones of the instrument.

Another object is to provide means whereby the motor may be easily and quickly installed upon or removed from its support from the front of the instrument without displacing the pumping bellows.

Other objects and uses relating to specific parts of the motor support will be brought out in the following description.

In the drawings—

Figure 1 is a front elevation of my improved wind-inducing device.

Fig. 2 is a top plan of the motor and its support.

Fig. 3 is an enlarged vertical sectional view of the same device taken on line 3—3, Fig. 2, omitting the motor which is shown in dotted lines.

Figs. 4 and 5 are a horizontal sectional view and a vertical sectional view taken, respectively, on lines 4—4, Fig. 3, and 5—5, Fig. 1.

In order that the specific application of my invention may be clearly understood I have shown parts of a self playing instrument comprising a wind chest —1—, a plurality of pumping bellows —2— arranged in pairs and mounted on opposite sides of the wind chest —1—, an electric motor —3— and suitable means for transmitting motion from the motor to the several bellows.

This power-transmitting means preferably consists of a crank shaft —4— journaled in suitable brackets or standards —5— which are supported upon the upper edge of the wind chest —1—, as shown more clearly in Fig. 1, the crank arms of the shaft —4— being connected by pitmen —6— to arms —7— on the movable sides of their respective bellows —2— for positively operating said movable sides in reverse directions.

The upper ends of the arms of opposite bellows are connected by coil springs —8— which are placed under sufficient tension to hold the ends of the pitmen —6— firmly against their respective journal bearings on the shaft —4— against lost motion, thereby reducing the liability of rattle or excessive noise from this source.

The shaft —4— is provided with a relatively large pulley —9— which is connected by a belt —10— to a relatively small pulley —11— on the corresponding end of the motor —3—, thus permitting the several bellows to be operated with considerable power through the medium of a relatively small motor.

The motor is, of course, driven at high speed and under ordinary conditions of installation within and upon a portion of the instrument case would cause more or less vibration of the various parts of the case, and consequent noise, but in order to overcome this the feet of the motor are secured to a plate —12— of wood or other suitable material, said plate being preferably rectangular in top plan and in turn rests upon an elastic, non-vibratory pad —13—, preferably of soft or sponge rubber, or may be of felt or equivalent substance.

The pad is surrounded and held in place by a marginal frame —14— also of wood or other suitable material, which together with the pad may rest flatwise upon a horizontal shelf —a— forming a part of the lower portion of the instrument case, the pad —13— being of slightly greater surface area than that of the plate —12— so as to support said plate and motor independently of the frame —14—, the latter being secured to a suitable support —a— by bolts or other fastening means.

The supporting plate —12— for the motor —3— rests loosely upon the upper surface of the pad —13— and together with the motor is held against lateral or endwise displacement by a band or strap —16— having its ends secured by the bolts —15— between one side of the frame —14— and the support —a— at one side of the motor, and its remaining portion passed around the upper side of the motor to the opposite side thereof where it forms a loop —17— for receiving a removable retaining member —18—.

This retaining member preferably consists of a round bar extending horizontally through and beyond the opposite edges of the loop —17— and substantially parallel with the axis of the motor, the upper faces of its opposite ends being flattened to form bearings for the heads of suitable fastening means, as screws —19—, which are screwed into the adjacent side of the frame —14—.

One end of the strap-retaining bar —18— is bifurcated or slotted to permit it to be placed endwise under the head of the adjacent screw —19— and withdrawn therefrom in securing and releasing the motor-retaining strap or band —16— without removing the adjacent screw —19—.

The other screw —19— is passed through an opening in the adjacent end of the bar —18— so that in order to remove the motor, it is only necessary to remove that screw, whereupon the bar may be withdrawn from the loop —17—, thus permitting the strap to be displaced from the motor to permit the removal of said motor, this operation being reversed in placing the motor upon the pad —13—.

The strap or band —16— is preferably made of canvas or other strong and durable material of approximately the same width as the periphery of the cylindrical portion of the motor case and may be tightened when necessary by simply tightening the screws —19—, under which conditions the pad —13— will yield slightly, thus producing constant tension upon the strap to firmly hold the motor in place without liability of transmitting its vibrations to any part of the instrument or producing appreciable noise.

The front and rear edges of the wind chest —1— are pivotally mounted near their lower ends upon adjacent supporting brackets, as —20—, independently of the motor support, said brackets being secured by screws —22— or other suitable fastening means to the upper surface of the shelf —a—, thus permitting the entire wind chest, together with the bellows mounted thereon to rock laterally toward and from the motor, the object of which is to permit the belt to be tightened or loosened, and also to permit the entire wind chest and bellows to be rocked downwardly on to the shelf if desired, where it may rest while the front bracket —20— is being removed in case it is necessary to take out this portion of the wind-inducing device independently of the motor.

An adjusting screw —25— is mounted in a bearing —26— on one edge of the wind chest —1—, the purpose of which is to tighten the belt when necessary,—that is, this adjusting screw is located some distance above one of the pivots, which support the wind-chest —1— so that when engaged with the bracket —20—, it will hold the wind-chest against undue rocking movement toward the motor, while the belt serves to hold the wind chest against rocking movement in the opposite direction or away from the motor, except as adjusted by the screw —25— in tightening the belt.

The wind-chest and pumping bellows, aside from being connected as a unit and mounted as described, may be of any suitable construction capable of producing the desired results, but form no part of my present invention which is a division of my application, Ser. No. 78,175, filed February 14, 1916.

It will be noted that the resilient supporting pad —13— for the motor not only serves to prevent the transmission of vibrations from the motor to the instrument case, but also to the remaining parts of the wind-inducing device, such as the wind-chest —1— and bellows —2—, and furthermore relieves the belt from excessive strains by reason of the fact that it is free to yield under varying loads applied to the pulling side of such belt.

From the foregoing description, it will be seen that the motor or the wind-chest, together with its pumping bellows, may be easily and quickly removed independently of each other by simply removing the bar —18— and the front bracket —20— without disturbing the rear screw —19—, thus permitting the motor and wind-chest to be reinstalled after removal with the assurance that they will be in proper relative position.

A slight tightening of the belt may be effected by the tightening of the screws —19— by which the motor will be drawn down on its resilient supporting pad, but the major tightening of the belt may be effected by tightening the adjusting screw —25—.

What I claim is:

1. The combination with an electric motor of a mounting therefor comprising a frame, a soft rubber pad inserted in the frame, a base for the motor resting loosely upon the surface of the pad, and a band passed over the top of the motor and having one end fastened to the frame at one side of the pad and its other end provided with a loop, a bar slidably inserted through the loop, and means on the adjacent side of the frame for supporting said bar.

2. In combination with an electric motor having a suitable base, a pad of pliable material upon which the base of the motor loosely rests, a strap or band extended around and upon the top of the motor, means for holding one end of the band in a fixed position relatively to the pad, and movable means for attaching the other end of the band to a fixed support.

3. In combination with an electric motor, a soft rubber pad, a support therefor, a band extending around and upon the top and sides of the motor and having one end secured to a fixed support and its other end provided with a loop, and a retaining bar inserted endwise through the loop and attached to a fixed support.

4. In a motor mounting, the combination of a frame, a pad of pliable material confined within the frame, the latter serving to prevent undue spread of the pad, a motor resting on the pad independently of the frame, a band or strap passed around the top and sides of the motor, means for anchoring one end of the strap at one side of the pad, and movable means for anchoring the other end of the strap at the opposite side of the pad.

In witness whereof I have hereunto set my hand this 31st day of July, 1918.

LEWIS B. DOMAN.

Witnesses:
  E. C. ATHERTON,
  MAYLOND C. BRITTON.